United States Patent [19]

Sano

[11] Patent Number: 4,699,935

[45] Date of Patent: Oct. 13, 1987

[54] INORGANIC FILLER-CONTAINING POLYOLEFIN RESIN COMPOSITIONS

[75] Inventor: Hironari Sano, Yokkaichi, Japan

[73] Assignee: Mitsubishi Petrochemical Company Limited, Tokyo, Japan

[21] Appl. No.: 844,359

[22] Filed: Mar. 26, 1986

[30] Foreign Application Priority Data

Mar. 26, 1985 [JP] Japan .................................. 60-61692

[51] Int. Cl.$^4$ .......................... C08K 9/00; C08K 7/14; C08K 7/10; C08K 9/06
[52] U.S. Cl. .................................. 523/206; 523/216; 523/217; 523/449; 525/903
[58] Field of Search ...................... 523/206, 216, 217; 524/449; 525/903

[56] References Cited

U.S. PATENT DOCUMENTS

| | | | |
|---|---|---|---|
| 3,532,662 | 10/1970 | Ansdell | 523/206 |
| 4,412,016 | 10/1983 | Fukui et al. | 523/206 |
| 4,433,073 | 2/1984 | Sano et al. | 523/206 |

FOREIGN PATENT DOCUMENTS

| | | |
|---|---|---|
| 2143831 | 6/1983 | United Kingdom . |
| 2156364 | 10/1985 | United Kingdom . |

OTHER PUBLICATIONS

Derwent, Abs. 60657x/32, Sumitomo Chemical KK, Jun. 1976, J51073043.
Derwent abstract 85-192673/32, Jun. 1985 Kalp Kogyo J60118738.
Derwent, Abstract 85-265835/43, J60177048, Idemitsu.
Derwent, Abstract 84-185781/30, J59105042, Show.
Derwent, Abstract 84-033147/06, J58222132, Mitsubishi.
Derwent, Abs. 84-033148/06, J58222133, Mitsubishi.

*Primary Examiner*—Herbert J. Lilling
*Attorney, Agent, or Firm*—Robert E. Burns; Emmanuel J. Lobato

[57] ABSTRACT

A novel inorganic filler-containing polyolefin resin composition exhibits high-level stiffness at a temperature in the vicinity of crystalline melting point of the matrix-forming polyolefin resin or even at a higher temperature. The composition comprises specified amounts of a matrix-forming polyolefin resin, a dispersion-phase-forming resin, and a fibrous or lamellate inorganic filler. In the composition, one end portion of an individual fiber or lamella of the fibrous of lamellate inorganic filler is embedded in the dispersion-phase-forming resin not uniformly miscible dispersed in the polyolefin resin and the other end portion of the individual fiber of lamella is also embedded in the dispersion-phase-forming resin located at a separate position, whereby the filler forms substantially a network structure via the dispersion-phase-forming resin.

33 Claims, 10 Drawing Figures

INORGANIC FILLER-CONTAINING POLYOLEFIN RESIN COMPOSITIONS

BACKGROUND OF THE INVENTION

This invention relates to a polyolefin resin composition filled with an inorganic filler in a specific manner to thereby improve the thermal resistance, stiffness, dimensional stability, and other properties thereof.

Extensive attempts have been made to improve thermal resistance, stiffness, dimensional stability etc., of polyolefin resins, especially crystalline polyolefin resins by filling them with a variety of inorganic fillers. Examples of such polyolefin resins are low-medium-or high-density polyethylene, isotactic polypropylene, crystalline ethylene-propylene copolymer, crystalline copolymers of a main component of ethylene and/or propylene and other ethylenically unsaturated monomer(s). Filling with inorganic fillers having relatively large aspect ratios such as fibrous, needle-like or lamellate fillers is effective. Especially, filling with glass fiber increases thermal resistance, stiffness, etc. of the resulting composition.

On the other hand, resin compositions filled with fibrous or lamellate fillers tend to cause poor appearance, decrease in impact strength, etc. of the resulting molded products. In order to eliminate such defects, several methods have been proposed, examples of which are: control of the fiber diameter of glass fiber (Japanese Laid-open patent application No. 226041/1984); control of particle size of talc (Japanese Laid-open patent application No. 222132/1983); and combined use of talc having a specified specific surface area and precipitated calcium carbonate (Japanese Laid-open patent application No. 16042/1982).

However, the materials obtained according to the above mentioned conventional methods in which the compositions are even filled with inorganic fillers exhibit marked decrease in stiffness at a temperature near the crystalline melting point of the matrix-forming polyolefin resin, for example, at a temperature over about 160° C. in the case of isotactic polypropylene and over about 120° C. in the case of high-density polyethylene. Thus, the utilization of such resin materials in the fields requiring higher stiffness, especially stiffness at high temperature, has been restricted.

SUMMARY OF THE INVENTION

In order to solve the above mentioned problems, we have conducted extensive research on the filling conditions of inorganic fillers in polyolefin resin matrixes. As a result, it has been unexpectedly found that, in the matrix comprising the polyolefin resin, one end or one portion of each fiber or lamella of the fibrous or lamellate inorganic filler is covered with or embedded in a resin forming a dispersion phase which is dispersed in the polyolefin resin, while the other end or another portion of that fiber or lamella of the filler is also covered with or embedded in the dispersion-phase-forming resin located at a separate position, whereby, in the case where the filler forms substantially a network or lattice structure via the dispersion-phase-forming resin, the polyolefin resin composition has excellent stiffness, especially stiffness at high temperature, which was not anticipated in conventional polyolefin products. That is, it has become possible to produce a composition of this character which can exhibit high-level stiffness at a temperature in the vicinity of crystalline melting point of the matrix-forming polyolefin resin or even at a higher temperature.

Thus the present invention relates to an inorganic filler-containing polyolefin resin composition which comprises by weight, 100 parts of a polyolefin resin, 20 to 150 parts of a dispersion-phase-forming resin not uniformly miscible with the polyolefin resin, and 3 to 80 parts of a fibrous or lamellate inorganic filler; composed of fibers or lamellas one end or one portion of each of the individual fibers or lamellas of the filler being covered with the dispersion-phase-forming resin, the other end or another portion thereof being also covered with the dispersion phase-forming resin located at a separate position, as a result the inorganic filler forming a substantial network structure via the dispersion-phase-forming resin.

The term "substantial network structure" herein means such structures having marked significance in the resulting effects, more specifically the structures exhibiting very low dependence of shear modulus on temperature in a shear modulus temperature curve in comparison with those having no network structure as seen from the drawings attached hereto.

DETAILED DESCRIPTION OF THE INVENTION

A polyolefin resin to be used as the matrix phase of the present composition is an $\alpha$-olefin homopolymer or a copolymer of a $\alpha$-olefins or a copolymer of a major amount of an $\alpha$-olefin and a minor amount of another unsaturated monomer.

The copolymer can be of any copolymeric type such as block-type, random-type, graft-type or combined type thereof.

The polyolefin resins include those modified by chlorination, sulfonation, etc.

The $\alpha$-olefins include, for example, ethylene, propylene, butene-1, pentene-1, hexene-1 and octene-1. Ethylene and propylene are preferred because they are readily available.

The above mentioned unsaturated monomers include, for example, unsaturated carboxylic acids and anhydrides, esters or salts thereof such as methacrylic acid, maleic acid and methyl methacrylate, and diene compounds.

The matrix-forming polyolefin resins are preferably crystalline resins having number-average molecular weights of 10,000 or more and crystalline melting points of 80° C. or more. Especially preferred are polyolefin resins having number-average molecular weights of 30,000 or more and crystalline melting points of 100° C. or more. More specifically, suitable resins are, for example, crystalline homopolymers of ethylene and propylene, crystalline copolymers of ethylene and propylene, or crystalline copolymers of main structural amounts of ethylene or propylene with other ethylenically unsaturated monomer(s). Examples of especially preferred resins are crystalline polypropylene and a crystalline copolymer of propylene and ethylene. Crystalline polypropylene is most preferred from the viewpoint of stiffness at a high temperature. It is preferred in view of molding flow properties that those resins have, i.e., a melt flow rate (MFR) in the range of 0.005 to 100 g/10 minutes and especially 0.01 to 50 g/10 minutes. It is also preferred in view of its stiffness. These resins have the value (% by weight) of insolubles in n-heptane (isotactic index) of 70 or more, especially of 90 or more, and typically 94 or more.

A compound mixture of an α-olefin homopolymer or an α-olefin copolymer with a rubber-like polymer can be used for the matrix to form a composition of the present invention. Preferred rubber-like polymers include a rubber-like polymer or copolymer of monoolefin or diolefin series. Suitable examples thereof are an ethylene-propylene copolymer rubber, an ethylene-butene copolymer rubber, and an ethylene-propylene-conjugated diene terpolymer. Especially preferred is a ethylene-propylene copolymer rubber.

The dispersion-phase-forming resin to be used in the present invention is a resin which can retain stiffness at a high temperature in comparison with the matrix-forming polyolefin resin. Suitable examples thereof are so-called engineering thermoplastic resins such as thermoplastic polyester, polycarbonate, polyamide, acetal resin, polyphenylene-ether, polyarylate, polyarylether, thermoplastic polysulfone, a halogen-containing thermoplastic resin, and a nitrile resin. Other crosslinkable thermoplastic resins or thermosetting resins which can be crosslinked or cured during or after molding can also be used. These dispersion phase-forming resins preferably have a higher melting point or a higher glass transition point than the matrix-forming resins. For example, it is suitable in view of stiffness at high temperature of the present composition that the crystalline melting point in the case of crystalline resins is 120° C. or more, preferably 150° C. or more, and the glass transition point in the case of non-crystalline resins is 120° C. or more, preferably 150° C. or more.

The dispersion-phase-forming resin is a resin containing a polar group having affinity sufficient to cover the end portions of the inorganic filler set forth hereinafter.

Varieties of the engineering thermoplastic resins mentioned above which are suitable for use in the present invention are shown below.

The thermoplastic polyester to be used in the present composition generally has a crystalline structure, the melting point of which is preferably 120° C. or more.

The preferred polyesters are polyethyleneterephthalate, polypropyleneterephthalate and polybutyleneterephthalate.

More preferred polyester is polybutyleneterephthalate, which can be produced by condensation polymerization of 1,4-butanediol and dimethyl terephthalate or terephthalic acid and has a polymeric chain represented by the general formula of:

wherein n is the degree of polymerization. The molecular weight of polybutyleneterephthalate is preferably 20,000 to 25,000.

Other polyesters such as cellulose ester, polypivalolactone and polycaprolactone can also be used in the present invention.

The polycarbonate to be used in the present composition has a polymeric chain represented by the general formulas of:

and wherein: Φ stands for phenylene group or an alkyl-, alkoxy-, halogen- or nitro-substituted phenylene group; A stand for carbon-carbon bond, or an alkylidene group, a cycloalkylidene group, an alkylene group, a cycloalkylene group, an azo group, an imino group, sulfur, oxygen, sulfoxide group or sulfone group; and n is at least 2.

Preferred polycarbonates are those represented by the above formulas (1) and (2) wherein Φ is p-phenylene group and A is isopropylidene group.

The polyamide to be used in the present composition is a condensation product containing a repeating unit having an aromatic and/or aliphatic amido group as the essential structural component in the polymer chain and is generally known as nylon. Specific examples thereof include polyhexamethylene adipamide (nylon 6,6), polypyrrolidone (nylon 4), polycaprolactam (nylon 6), polyheptolactam (nylon 7), polycaprilolactam (nylon 8), polynonanolactam (nylon 9), polyundecanolactam (nylon 11), polydodecanolactam (nylon 12), and polyhexamethylene cebacamide (nylon 6, 10). Copolymeric polyamides can also be used. Examples of preferable nylon are nylon 6, nylon 6,6, nylon 11 and nylon 12. Suitable number-average molecular weight of these nylon is 10,000 or more.

Acetal resins to be used in the present composition include, for example, polyacetal homopolymer produced by polymerization of formaldehyde or trioxane, and a polyacetal copolymer. Examples of these copolymers include a block copolymer of formaldehyde with an alkylene glycol, a polythiol or a vinyl acetate-acrylic acid copolymer. Of these copolymers, especially useful in the present composition is, for example, a copolymer of formaldehyde and ethylene oxide.

Polyphenyleneether can also be used in the present composition. This engineering thermoplastic resin has a polymeric chain represented by the general formula of:

wherein $R_1$, $R_2$, $R_3$ and $R_4$ stand for hydrogen, a halogen, an unsubstituted or substituted hydrocarbon, cyano group, an alkoxy group or phenoxy group, nitro group, amino group or sulfo group, respectively, and n is an integer of at least 2.

Of these polymers, especially suitable for the present composition are poly(2,6-dimethyl-1,4-phenylene) ether, poly(2,6-diethyl-1,4-phenylene)ether, or mixtures thereof with polystyrene. These polyphenyleneethers preferably have a degree of polymerization in the range of 20 to 800.

A polyarylate to be used in the present composition has a polymeric chain represented by the general formula of:

and preferable has a degree of polymerization of 10 to 1,000.

A thermoplastic polysulfone can also be used in the present composition and has at least some units represented by the general formula of:

wherein Z is oxygen, sulfur or an aromatic diol residue. Such units can be exemplified by any of the following repeating units:

The halogen-containing thermoplastic resins which can be used in the present composition include tetrafluoroethylene polymer, chlorotrifluoroethylene polymer, and vinylidene fluoride polymer. A homopolymer or copolymer derived from vinylidene chloride can also be used in the present composition.

Preferred halogen-containing thermoplastic resins are a homopolymer or copolymer of vinylidene fluoride as well as crystalline vinylidene chloride copolymer.

The nitrile resins to be used in the present composition are those containing 50% by weight or more of an α,β-olefinic unsaturated mononitrile. The α,β-olefinic unsaturated mononitrile has a structural formula of:

wherein R is hydrogen, an alkyl group having 1 to 4 carbon atoms or a halogen. The most preferable olefinic unsaturated nitriles are acrylonitrile, methacrylonitrile, and mixtures thereof.

A polyarylether can also be used.

The above mentioned engineering thermoplastic resins can be used alone or in combination. The resins can be introduced with sulfonic acid group, amino group, nitro group, a halogen group, etc. or copolymerized with an unsaturated organic acid or an acid anhydride, as necessary to satisfactorily cover the ends of fibrous or lamellate fillers.

The inorganic fillers to be used in the present composition are required to satisfy the following two conditions.

(1) The shape of the filler should be anisotropic, so that the filler substantially forms a network structure via the dispersion-phase-forming resin in the polyolefin resin matreix. In other words, it is necessary that the filler have a large aspect ratio. Thus, a fibrous or lamellate filler is used for this purpose.

(2) The ends of the fibrous or lamellate inorganic filler should be covered with or embedded in the dispersion-phase-forming resin. In other words, the ends of the inorganic filler, as they are or after treatment with another component, should have a larger affinity for the dispersion-phase-forming resin than for the matrix-forming polyolefin resin.

The "ends" of the inorganic filler as used throughout the specification and claims means substantially both end portions of the individual fibers in the case of fibrous fillers, and substantially the side or edge of the portions of the individual lamellate plates other than the two major surfaces of the plate in the case of lamellate fillers.

The fibrous inorganic filler, one of the anisotropic fillers, is comprised of at least one inorganic solid substance having fibrous shape such as glass fiber, carbon fiber, potassium titanate, xonotlite, wallastnite, slag fiber, sepiolite, dawsonite, gypsum fiber, and asbestos. Of these fibrous inorganic fillers, the filler preferred for forming the objective network structure is a filler having a fiber diameter of 30 μm or less, especially glass fiber of such size. A more preferable filler is glass fiber having a fiber diameter of 15 μm or less.

The lamellate inorganic filler, the other one of the anisotropic fillers, is comprised of at least one inorganic solid substance having lamellate shape such as mica, sericite, talc and glass flakes. Of these lamellate fillers, the filler preferred for forming the objective network structure is a lamellate inorganic filler having an aspect ratio of 30 or more.

These inorganic fillers can be used without further treatment. More specifically, an inorganic filler such as talc and mica having markedly greater affinity at its side portions than at its lamellate surfaces can be used as it is without treatment to produce the present compostion.

The inorganic filler can be surface-treated with a surface treating agent. For example, the end portions of the inorganic filler can be coat-treated with a surface treating agent which is highly hydrophilic. Also, the whole body of the individual inorganic filler can be coat-treated with a non-hydrophilic surface-treating agent and then crushed before or in the course of blending or kneading with the resin components, whereby only the end portions of the filler turn hydrophilic because of crushing or peeling of the coated layer of the hydrophobic agent and the intermediate portion between the end portions remains non-hydrophilic. Such treated fillers can be used to produce the present composition.

The method of surface-treatment with the non-hydrophilic surface-treating agent is convenient because it is simpler than the method of surface-treating the end portions of the inorganic filler with a hydrophilic surface-treating agent. This method is especially preferred for the fibrous inorganic filler.

Even with the same surface treating agent used, it may sometimes become hydrophilic or non-hydrophilic, depending upon the types of the inorganic filler and dispersion-phase-forming resin used.

The above mentioned surface-treating agents include, for example, alcohols such as methanol, ethanol, stearyl alcohol and octyl alcohol; higher fatty acids or derivatives thereof (e.g., esters and salts) such as stearic acid, oleic acid, calcium stearate, magnesium stearate, calcium oleate, and oleic acid amide; silane coupling agents such as vinyltrimethoxysilane, vinyltriethoxysilane, and γ-chloropropyl-trimethoxysilane; titanium coupling agents such as isopropyltriisostearoyl titanate, isopropyltrilaurylmyristyl titanate, and isopropyltridiisooctyl phosphate titanate; and unsaturated carboxylic acid or esters thereof such as acrylic acid, methacrylic acid, methyl acrylate, and methyl methacrylate.

The present composition contains the inorganic filler in an amount of 3 to 80%, preferably 5 to 60%, more preferably 10 to 40% by weight of the whole composition.

The polymer components (excluding the inorganic filler) in the present composition contain the polyolefin resin and the dispersion-phase-forming resin in the amounts of 35 to 95% and 65 to 5%, preferably 40 to 80% and 60 to 20%, respectively, by weight of all resin components.

Other components which can be added to the present composition are stabilizers such as antioxidants, ultraviolet light absorbers, weathering agents, anti-heat degradation agents, anti-corrosive agents and anti-copper damage agents, anti-flaming agents, antistatic agents, lubricants, neutralizers, foaming agents, dispersing agents, etc. The quantities of these additive components to be used are such that are generally used in conventional synthetic resins.

The present composition is generally produced by kneading the above mentioned components by means of kneaders such as a monoaxial extruder, a biaxial extruder, Banbury mixer, rollers, Brabender plastograph, etc., and then cooling them to solidness. As necessary, a solution mixing method which comprises mixing a solvent-soluble component and an insoluble component in a suspension state can be employed. In these methods, the sequence of adding the polyolefin resin, dispersion phase-forming resin and inorganic filler is not especially restricted; these components can be added in any sequence or at the same time.

The nature and utility of the present invention is more specifically and fully indicated by way of the following Examples.

EXAMPLE 1 AND COMPARATIVE EXAMPLES 1a AND 1b

In a supermixer, 40 parts by weight of crystalline polypropylene pellets (MA-6, MFR: 1.2 supplied by Mitsubishi Yuka K. K., Japan), 40 parts by weight of polycarbonate pellets (Yupilon S-2000 supplied by Mitsubishi Gas Kagaku K. K., Japan) and 20 parts by weight of glass fiber 6 μm in fiber diameter (supplied by Asahi Glass K. K., Japan) surface-treated with stearyl alcohol were kneaded together with 0.15% each by weight of 2,6 di-t-butyl-4-methylphenol and n-octadecyl-β-(4'-hydroxy-3',5'-di-t-butylphenyl)propion acid ester on the basis of the total weight of polypropylene resin and polycarbonate resin. The mixture was further kneaded in a Brabender plastograph and then cool-solidified into pellets [Example 1].

For the comparison, a composition not filled with the glass fiber, namely, a composition comprising 50 parts by weight of polypropylene and 50 parts by weight of polycarbonate was pelletized as in Example 1 [Comp. Ex. 1a].

Also, a composition similar to that of Example 1 except that a polycarbonate was not added, namely, a composition comprising 80 parts by weight of polypropylene and 20 parts by weight of glass fiber, was pelletized as in Example 1 [Comp. Ex. 1b].

Figure 1:
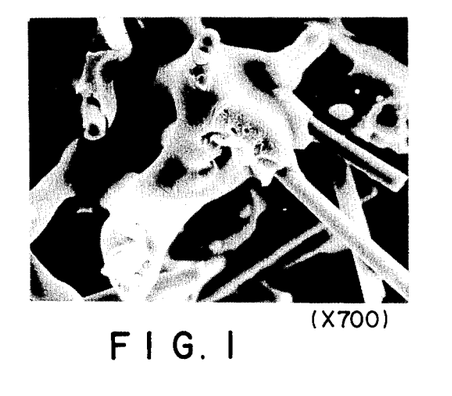
FIGS. 1, 2, 4 and 5 are scanning electron micrographs showing the structural states of the compositions of the Examples and Comparative Examples set forth hereinafter, wherein the magnification of the photographs is ×700 in FIGS. 1 and 2, and ×350 in FIGS. 4 and 5.
Figure 2:
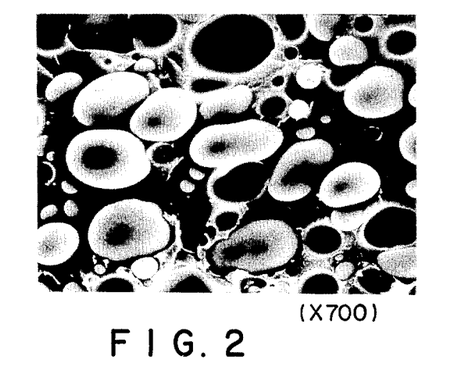

The results of morphological observation of these pellets are shown in FIG. 1 [Example 1] and FIG. 2 [Comp. Ex. 1a]. The observation was conducted in the following manner. The composition was fractured in liquid nitrogen, and the fractured surfaces were subjected to ion etching. In general, a polyolefin resin, especially polypropylene resin is easily etched in comparison with an engineering thermoplastic resin. Finally, the etching-treated surfaces were coated with gold to impart electroconductivity thereto and observed under a scanning electron microscope (HHS-2R type supplied by Hitachi Seisakusho, Japan).

From FIG. 2 [Comp. Ex. 1a], it is seen that polycarbonate resin is pesent as a dispersion phase having a dispersion diameter of several μm to 20 μm in the matrix of polypropylene resin.

From FIG. 1 [Example 1], it is seen that, when the glass fiber is added into the composition of Comp. Ex. 1a, the fiber penetrates into and becomes embedded in the dispersion phase of the polycarbonate resin and thus a network structure is formed in the polypropylene matrix. The reasons for forming such a network structure (i.e., penetration of the glass fiber into the polycarbonate dispersion phase) are because the surfaces of the glass fiber were previously treated with stearyl alcohol and thus almost no active groups such as silanol group are present on the intermediate portion, but the end surfaces of the glass fiber are fractured and exposed in the course of supermixer kneading and Brabender plastograph kneading to obtain the composition, and therefore active groups such as silanol group are exposed on the fractured surfaces (i.e., the end surfaces of the glass fiber). Thus, the fractured and exposed surface is more polar than the non-polar or active surfaces and has stronger affinity for the polar polycarbonate resin. In contrast, the non-polar polypropylene resin has affinity for the stearyl alcohol-treated surfaces of the glass fiber. As a result, it is considered that the glass fiber forms a network structure via the polycarbonate resin.

These pellets were molded into pressed sheets of 2 mm in thickness by a compression molding machine supplied by Toyo Seiki Seisaksho, Japan. The dependence of shear modulus of the pressed sheet on temperature was measured from the dynamic solid visco-elasticity. The measurement was conducted at a frequency of 1 Hz, with a strain of 0.1 to 1.5%, and at a temperature interval of 5° to 10° C., by means of a mechanical spectrometer (RMS-605) supplied by Rheometrics Company.

The relations between shear modulus of elasticity G' ($dyn/cm^2$) and temperature (°C.) of the compositions obtained in Example 1, Comp. Ex. 1a and Comp. Ex. 1b are shown in FIG. 3.

Figure 3:
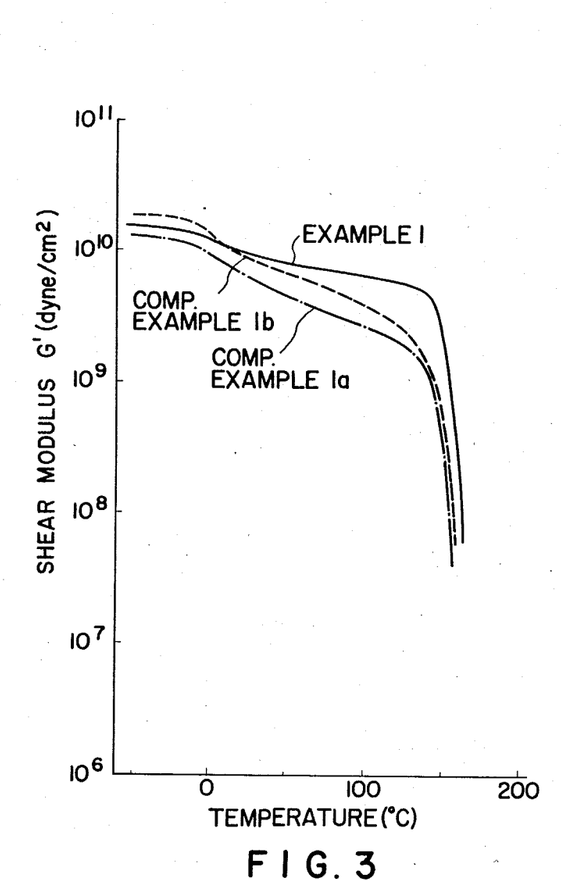
FIG. 3 and FIGS. 6 through 10 show shear modulus vs. temperature curves for compositions of Examples and Comparative Examples, respectively.

As is clearly seen from FIG. 3, the decrease in shear modulus G' at a higher temperature of the present composition of Example 1 having a network structure is very small in comparison with those of Comp. Examples 1a and 1b. For example, the ratio G' (120° C.)/G' (23° C.) of the shear moduli G' at 23° C. and 120° C. was calculated to show the dependence of the shear modulus on temperature. It is seen that the dependence of shear modulus on temperature is very small in the case of the present invention, because the dependence of Comp. Ex. 1a is as low as 0.3, that of Comp. Ex. 1b is as low as 0.31, but the dependence of the present composition (Example 1) having a network structure comprising polycarbonate resin and glass fiber is as high as 0.59.

Also, the impact resistance of the present composition of Example 1 was evaluated and found to be an amply high value for practical uses.

EXAMPLES 2 AND 3 AND COMPARATIVE EXAMPLE 2

In the composition of Example 1, nylon-6 (KR-4411 of BASF) resin was used instead of polycarbonate. The resulting mixture was kneaded and cool-solidified to obtain pellets as in Example 1 [Example 2].

For the comparison, a composition wherein glass fiber was not added in the composition of Example 2, namely, a composition comprising 50 parts by weight of crystalline polypropylene resin and 50 parts by weight of nylon-6 resin, was obtained as in Example 2 [Comp. Ex. 2].

Also, in the composition of Example 1, a composition wherein polybutylene terephthalate resin (1401 of Toray Company, Japan) was used instead of the polycarbonate resin was obtained as in Example 1 [Example 3].

Figure 4:
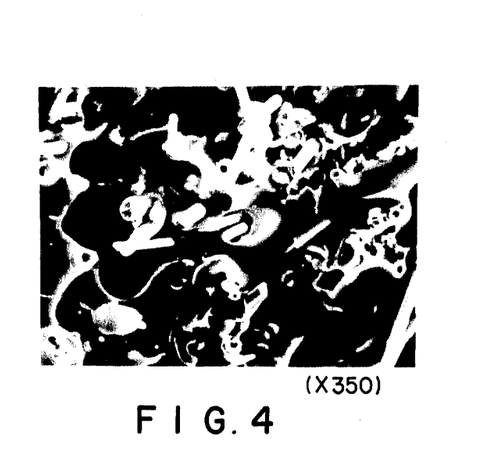
Figure 5:
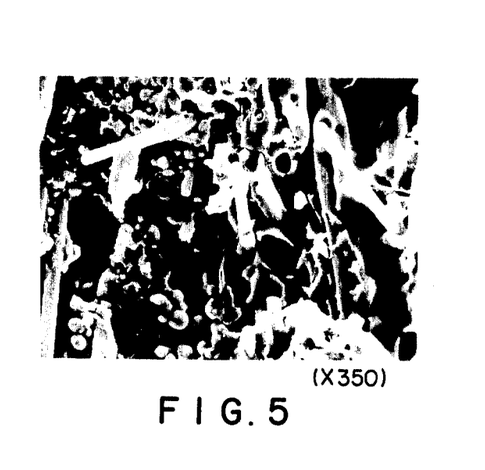

The structures of pressed sheets obtained from the compositions of Examples 2 and 3 are shown in the scanning electron micrographs of FIGS. 4 and 5, respectively.

From these micrographs, it is seen that these compositions show a unique structure wherein the glass fiber has a network structure in the polypropylene matrix via the dispersion phase of an engineering thermoplastic resin (nylon-6 or polybutylene terephthalate).

Figure 6:
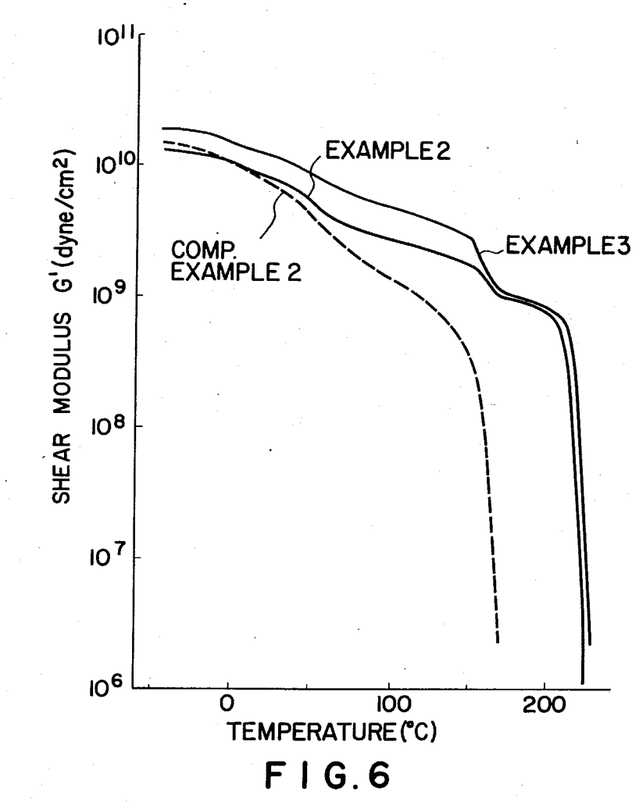

The dependence of modulus of elasticity of these compositions on temperature is shown in FIG. 6.

The composition of Comp. Ex. 2, wherein nylon-6 having no network structure was simply dispersed as a dispersion phase in polypropylene, has a markedly decreased shear modulus at a higher temperature. In contrast, it is seen that the present composition of Example 2 having a network structure has a very high shear modulus even at a high temperature. Similarly, the composition of Example 3 also has a small dependence of shear modulus on temperature. For example, the ratio value G' (140° C.)/G' (23° C.) of the shear moduli at 23° C. and 140° C. is 0.08 in the comparative example (i.e., the modulus at 140° C. is only 8% of the modulus at room temperature of 23° C.), whereas that of Example 2 is 0.24 and that of Example 3 is 0.29. Thus, the dependence of shear modulus on temperature is very small in the present compositions. Moreover, it is surprisingly noted that the compositions of Examples 2 and 3 retain a high-level shear modulus ($10^9$ $dyn/cm^2$) even at a temperature of not less than the crystalline melting temperature (160° to 170° C.) of the matrix-forming crystalline polypropylene resin. This is because the glass fiber forms a network structure via the engineering thermoplastic resin.

EXAMPLES 4 AND 5

In the composition of Example 3, a lamellate filler of mica (200H of Koizumi, Japan) or talc (Micronwhite 5000S of Hayashi Kasei, Japan) was used instead of glass fiber. The resulting mixture was kneaded and cool-solidified to obtain pellets [Examples 4 and 5].

The structures of these compositions were observed under a scanning electron microscope. The electron micrographs show morphological structures wherein the edges of mica (in the composition of Example 4) or the edges of talc (in Example 5) are covered with the dispersion phase of the engineering thermoplastic resin polybutylene terephthalate.

In general, the lamellate filler such as mica and talc has higher activity at the edge surfaces of the filler than at the lamellate major surfaces thereof as seen from their chemical structures. In other words, the filler has stronger affinity for polybutylene terephthalate at the edge surfaces thereof than at the lamellate surfaces thereof. Thus, the present compositions have unique morphological structures as mentioned above.

Figure 7:
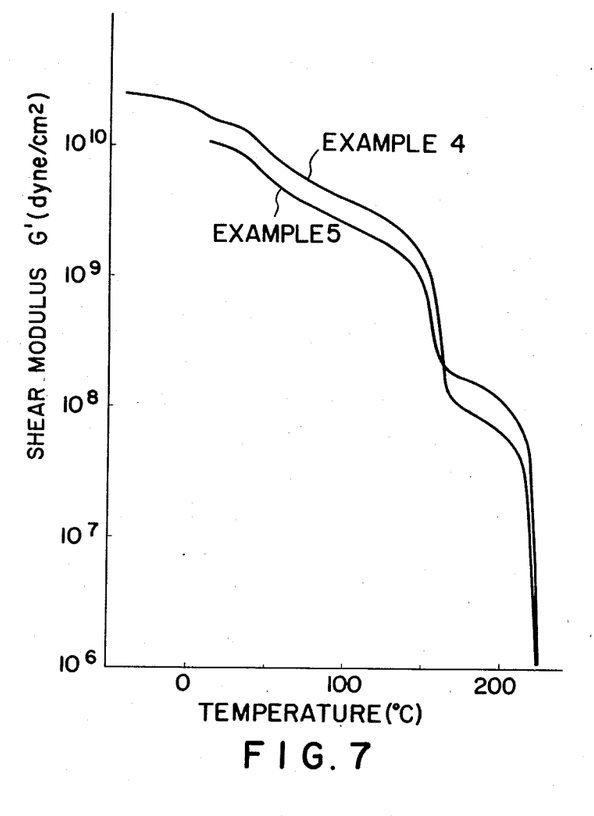

The dependence of shear modulus on temperature of these compositions is shown in FIG. 7. It is seen that the modulus is large at room temperature as well as even at a higher temperature because the lamellate filler has a network structure via polybutylene terephthalate resin. Moreover, it is also one of the features exhibited due to the network structure that the present composition has high-level shear modulus even after crystalline melting of the polypropylene matrix resin.

EXAMPLE 6 AND COMPARATIVE EXAMPLE 6

The procedure of Example 1 was carried out with the use of glass fiber 13 μm in fiber diameter surface-treated with octyl alcohol instead of the glass fiber 6 μm in diameter surface-treated with stearyl alcohol. The resulting mixture was processed as in Example 1 to obtain a composition [Example 6].

Further, in the procedure of Example 1, particulate precipitated calcium carbonate 0.3 μm in particle diameter was used instead of the glass fiber. A composition was obtained as in Example 1 [Comp. Ex. 6].

Figure 8:
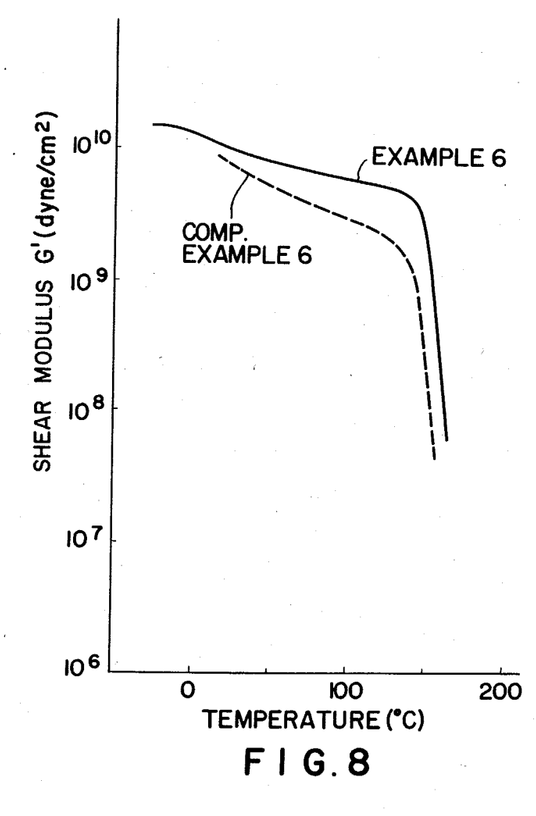

The morphological structure of the Example 6 composition was such that the glass fiber 13 μm in fiber diameter formed a network structure via the polycarbonate resin. The dependence of shear modulus on temperature of the compositions of Example 6 and Comp. Example 6 is shown in FIG. 8.

The present composition [Example 6], wherein glass fiber was used as the filler and a network structure was formed, has a high shear modulus at the room temperature, and the decrease in this modulus thereof at a higher temperature is very small in comparison with the composition [Comp. Ex. 6] wherein particulate calcium carbonate was used (impossible to form the network structure). Thus, the dependence of shear modulus on temperature is very small in the present composition. In this connection, the ratio of shear moduli at 23° C. and 120° C. was 0.54 in the case of the composition of Example 6 having the network structure and was 0.15 in the case of the particulate-filler containing compound of Comp. Example 6.

EXAMPLES 7 AND 8

The procedure of Example 1 was carried out with the use of crystalline ethylene-propylene copolymer (BC8 of Mitsubishi Yuka K. K., Japan; ethylene content 15% by weight) instead of the crystalline polypropylene. A composition was obtained as in Example 1 [Example 7].

Further, the procedure of Example 1 was carried out with the use of 50 parts by weight of crystalline polpropylene pellets (MA6) and 30 parts by weight of polycarbonate (S-20000) to obtain a composition [Example 8].

The morphological structures of these compositions were observed. The network structure of glass fiber via polycarbonate was confirmed in both of the compositions of Examples 7 and 8.

Figure 9:
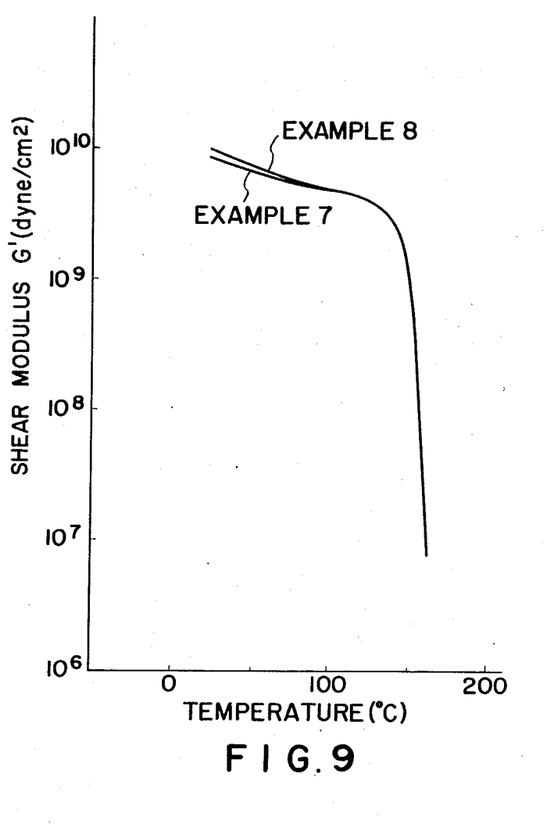
Figure 10:
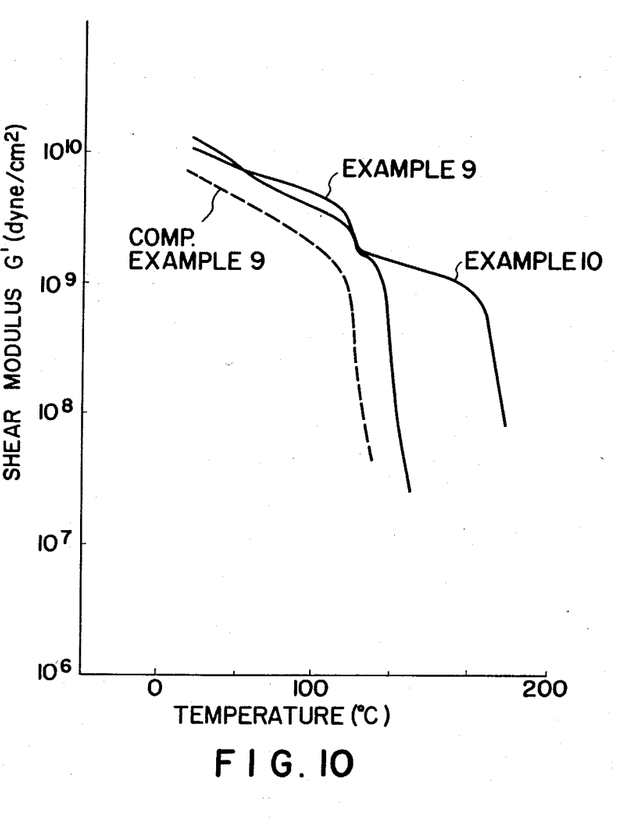

The dependence of shear modulus on temperature of these compositions is shown in FIG. 9. The ratio value of moduli G' at 23° C. and 120° C.: G' (120° C.)/G' (23° C.) was 0.49 in Example 7 and 0.45 in Example 8. It is seen that the dependence of shear modulus on temperature is small because of the network structure.

EXAMPLE 9, COMP. EXAMPLE 9 AND EXAMPLE 10

A composition as in Example 1 was obtained by using high-density polyethylene (PY-40 supplied by Mitsubishi Yuka K. K., Japan) instead of the crystalline polypropylene, to obtain the composition [Example 9].

For the comparison, a composition comprising 50 parts by weight of high-density polyethylene and 50 parts by weight of polycarbonate resin was obtained in a similar method, wherein glass fiber was not added [Comp. Ex. 9].

Further, the procedure of Example 9 was followed by using polybutylene terephthalate instead of the polycarbonate resin to obtain a composition [Example 10].

The morphological structures of these compositions were observed. As a result, the composition of Comp. Example 9 shows a simple structure wherein the dispersion phase of polycarbonate particles in the range of several $\mu$m to 25$\mu$m in diameter are dispersed in the high-density polyethylene matrix. The present composition filled with glass fiber showed a unique structure wherein the glass fiber formed a network structure via the polycarbonate resin in the case of Example 9 and via the polybutylene terephthalate resin in the case of Example 10.

The dependence of shear modulus on temperature of these compositions largely depends on the above mentioned morphological structures of the compositions. More specifically, the composition of Comp. Example 9 has a great dependence of shear modulus on temperature, wherein polycarbonate resin is simply dispersed in the polyethylene matrix. The compositions of Examples 9 and 10, wherein the thermoplastic engineering resin and glass fiber form the unique network structure, have small dependence of shear modulus on temperature. Especially, the composition of Example 10 retains a high shear modulus even at a temperature over the crystalline melting point of polyethylene and as high as the crystalline melting point of polybutylene terephthalate. Such properties could not be obtained by simply compounded resin materials. Moreover, the impact strength of the present compositions having such network structures was evaluated and showed satisfactory values for practical uses.

As described above, in the present compositions, the end portions of each piece of fibrous or lamellate filler are covered with a dispersion-phase of a dispersion phase-forming resin in a continuous phase-forming polyolefin resin matrix and form a network morphological structure via the dispersion phase. As a result, excellent stiffness especially at a high temperature, which could not be expected by a simple mix composition of the polyolefin resin and dispersion phase-forming resin or a simple mix composition containing a filler, are obtained. Moreover, the stiffness at a high temperature is exhibited with little dependence of shear modulus on temperature, and the excellent shear modulus is still exhibited even at a temperature higher than the crystalline melting point of the matrix-forming polyolefin resin.

Thus, the compositions of the present invention are expected to have broad applications to various industrial fields requiring very severe stiffness performances at a high temperature, such as automobile parts or machine parts and especially such large-scale parts. The present compositions have excellent properties for such developments.

What is claimed is:

1. An inorganic filler-containing polyolefin resin composition comprising: by weight, 100 parts of a matrix-forming polyolefin resin; 20 to 150 parts of a dispersion-phase-forming resin not uniformly miscible with the polyolefin resin, said dispersion-phase-forming resin having a higher melting point or a higher glass transition point than those of the matrix-forming polyolefin resin; and 3 to 80 parts of a fibrous or lamellate inorganic filler composed of fibers or lamellas, said fibers having a diameter of not more than 308 $\mu$m and said lamellas having an aspect ratio of not less than 30, said fibers and lamellas having a coat-treated non-hydrophilic intermediate portion and a pair of non-coat-treated hydrophilic end portions, one end portion of each of the fibers or lamellas being covered with the dispersion-phase-forming resin, and the other end portion of each of the fibers of lamellas being also covered with the dispersion-phase-forming resin dispersed in the matrix-forming polyolefin separately from that covering the one end of each of the fibers or lamellas, whereby the inorganic filler forms substantially a network structure via the dispersion-phase forming resin.

2. The composition according to claim 1; in which the polyolefin resin is selected from the group consisting of an $\alpha$-olefin homopolymer, an $\alpha$-olefin copolymer, a copolymer of an $\alpha$-olefin and other unsaturated monomers, and mixtures thereof, all having a number-average molecular weight of not less than 10,000 and a crystalline melting point of not lower than 80° C.

3. The composition according to claim 2; in which the polyolefin resin is selected from the group consisting of an $\alpha$-olefin homopolymer, an $\alpha$-olefin copolymer, a copolymer of an α-olefin and other unsaturated monomer, and mixtures thereof, all having a number-average molecular weight of not less than 30,000 and a crystalline melting point of not lower than 100° C.

4. The composition according to claim 1; in which the dispersion-phase-forming resin comprises at least one member selected from the group consisting of thermoplastic polyester, polycarbonate, polyamide, acetal resin, polyphenylene-ether, polyarylate, polyarylether, thermoplastic polysulfone, halogen-containing thermoplastic resin, and nitrile resin.

5. The composition according to claim 1; in which the dispersion-phase-forming resin has a crystalline melting point of not lower than 120° C. in the case of a crystalline resin or a glass transition point of not lower than 120° C. in the case of a non-crystalline resin.

6. The composition according to claim 1; in which the dispersion-phase-forming resin has a crystalline melting point of not lower than 150° C. in the case of a crystalline resin or a glass transition point of not lower than 150° C. in the case of a non-crystalline resin.

7. The composition according to claim 1; in which the fibers of the fibrous inorganic filler have a fiber diameter of not more than 15 μm.

8. The composition according to claim 1 or 7; in which the fibrous inorganic filler comprises glass fibers.

9. The composition according to claim 1; in which the lamellate inorganic filler comprises at least one member selected from the group consisting of mica, sericite, talc and glass flakes.

10. The composition according to claim 1; in which the quantities of the polyolefin resin and dispersion-phase-forming resin are 35 to 95% and 65 to 5% by weight of the total amount of both of the resins, respectively.

11. The composition according to claim 1; in which the quantities of the polyolefin resin and dispersion-phase-forming resin are 40 to 80% and 60 to 20% by weight of the total amount of both of the resins, respectively.

12. The composition according to claim 1; in which the quantity of the inorganic filler is 3 to 80% by weight.

13. The composition according to claim 1; in which the quantity of the inorganic filler is 5 to 60% by weight.

14. The composition according to claim 1; in which the quantity of the inorganic filler is 10 to 40% by weight.

15. The composition according to claim 1; in which said coat-treated non-hydrophilic intermediate portion and said non-coat-treated hydrophilic end portions are formed by coat-treating the fibers or lamellas with a non-hydrophilic surface-treating agent, and crushing the coat-treated fibers or lamellas prior to or in the course of blending or kneading of the resin components so that only the end portions of the fibers or lamellas are made hydrophilic because of crushing or peeling of the coated non-hydrophilic agent.

16. A network structure resin composition comprising: 100 parts by weight of a polyolefin resin constituting a matrix phase of the resin; 20 to 150 parts by weight of a dispersed resin dispersed in the matrix phase to constitute a dispersion phase; and 30 to 80 parts by weight of an inorganic filler composed of fibers or lamellas, the individual fibers or lamellas having a relatively non-hydrophilic intermediate portion and a pair of relatively hydrophilic end portions, the relatively non-hydrophilic intermediate portion being embedded, due to its non-hydrophilic characteristics, in the matrix phase and the pair of relatively hydrophilic end portions being embedded, due to their hydrophilic characteristics, in the separate portions of the dispersion phase and being isolated from each other by the matrix phase so that the inorganic filler interconnects the dispersion phase to constitute a network structure.

17. The composition according to claim 16; in which the polyolefin resin is selected from the group consisting of an α-olefin homopolymer, an α-olefin copolymer, a copolymer of an α-olefin and unsaturated monomers, and mixtures thereof.

18. The composition according to claim 17; in which the polyolefin resin has a number-average molecular weight of not less than 10,000 and a crystalline melting point of not lower than 80° C.

19. The composition according to claim 18; in which the polyolefin resin has a number-average molecular weight of not less than 30,000 and a crystalline melting point of not lower than 100° C.

20. The composition according to claim 16; in which the dispersed resin comprises a crystalline resin having a crystalline melting point higher than that of the polyolefin resin or a non-crystalline resin having a glass transition point higher than the melting point of the polyolefin resin.

21. The composition according to claim 20; in which the dispersed resin is selected from the group consisting of a thermoplastic polyester, a polycarbonate, a polyamide, an acetal resin, polyphenylene-ether, a polyarylate, a polyarylether, a thermoplastic polysulfone, a halogen-containing thermoplastic resin and a nitrile resin.

22. The composition according to claim 20; in which the crystalline resin has a crystalline melting point of not lower than 120° C. and the non-crystalline resin has a glass transition point of not lower than 120° C.

23. The composition according to claim 22; in which the crystalline resin has a crystalline melting point of not lower than 150° C. and the non-crystalline resin has a glass transition point of not lower than 150° C.

24. The composition according to claim 16; in which the inorganic filler fibers have a diameter of not more than 30 μm.

25. The composition according to claim 24; in which the inorganic filler fibers have a diameter of not more than 15 μm.

26. The composition according to claim 16; in which the inorganic filler comprises glass fibers.

27. The composition according to claim 16; in which the inorganic filler lamellas have an aspect ratio of not less than 30.

28. The composition according to claim 16; in which the inorganic filler comprises at least one member selected from the group consisting of mica, sericite, talc flake, and glass flake.

29. The composition according to claim 16; in which the fibers and lamellas comprise a coat-treated non-hydrophilic intermediate portion and a pair of non-coat-treated hydrophilic end portions.

30. The composition according to claim 29; in which the coat-treated non-hydrophilic intermediate portion includes a non-hydrophilic surface layer applied to the intermediate portion of each of the fibers or each of the lamellas.

31. The composition according to claim 30; in which the non-hydrophilic surface layer comprises a non-hydrophilic surface-treating agent.

32. A method of making a network structure resin composition, comprising the steps of: preparing 100 parts by weight of a non-polar polyolefin resin, 20 to 150 parts by weight of a polar resin and 3 to 80 by weight of an inorganic filler composed of fibers or lamellas; coat-treating the individual fibers or lamellas with a non-hydrophilic agent to form a non-hydrophilic layer on the individual fibers or lamellas; selectively crushing or peeling the non-hydrophilic layer deposited at a pair of end portions of the individual fibers or lamellas to expose the pair of end portions to activate the same; kneading together the polyolefin, the polar resin and the inorganic filler in a liquid stage of the mixture to thereby disperse the polar resin in the polyolefin and, at the same time, cover the pair of activated end portions of the individual fibers or lamellas with the separately dispersed polar resin; and cooling the mixture to form a matrix phase of the polyolefin, a dispersed phase of the polar resin and a network structure of the fibers or lamellas embedded in the isolated portion of the dispersed phase at the pair of end portions thereof.

33. The method according to claim 32; in which the non-hydrophilic layer is selectively crushed or peeled during the kneading step.

* * * * *